(12) United States Patent
Demontmorency

(10) Patent No.: US 6,682,298 B2
(45) Date of Patent: Jan. 27, 2004

(54) ROTATING SHAFT CONFINEMENT SYSTEM

(76) Inventor: David George Demontmorency, 1220 Shouldice Sideroad, Cambridge, Ontario M1R 5J5 (CA)

( * ) Notice: Subject to any disclaimer, the term of this patent is extended or adjusted under 35 U.S.C. 154(b) by 15 days.

(21) Appl. No.: 10/147,459

(22) Filed: May 17, 2002

(65) Prior Publication Data

US 2003/0215326 A1 Nov. 20, 2003

(51) Int. Cl.⁷ .................................. F03B 3/02
(52) U.S. Cl. ........................ 415/133; 415/173.2
(58) Field of Search .................. 415/119, 126, 415/127, 133, 168.1, 168.2, 170.1, 173.1, 173.2, 173.4, 173.6, 174.1, 174.4; 464/180

(56) References Cited

U.S. PATENT DOCUMENTS

| | | | |
|---|---|---|---|
| 1,352,276 A | 9/1920 | Junggren | 415/135 |
| 3,224,666 A | 12/1965 | Ljungström et al. | 415/173.2 |
| 3,656,862 A | 4/1972 | Rahaim et al. | 415/173.2 |
| 3,756,741 A | 9/1973 | Woell, Jr. | 415/173.4 |
| 3,947,148 A | 3/1976 | Holt | 415/119 |
| 4,120,605 A | 10/1978 | Hurst | 415/197 |
| 4,251,185 A | 2/1981 | Karstensen | 415/136 |
| 4,330,234 A | 5/1982 | Colley | 415/173.2 |
| 4,529,355 A | 7/1985 | Wilkinson | 415/173.1 |
| 4,925,363 A | 5/1990 | Brown et al. | 415/129 |
| 5,096,375 A | 3/1992 | Ciokailo | 415/173.2 |
| 5,555,956 A | 9/1996 | Voss et al. | 415/110 X |
| 5,653,577 A * | 8/1997 | Wuhrer | 415/1 |

FOREIGN PATENT DOCUMENTS

JP         57070997 A  *  5/1982  ........... F04D/29/08

* cited by examiner

Primary Examiner—Edward K. Look
Assistant Examiner—Richard A. Edgar
(74) Attorney, Agent, or Firm—Anthony Asquith & Co.

(57) ABSTRACT

In a double-ended Francis turbine, shaft whip at critical speed is alleviated by pitching tappets in the housing, around the rotor. The tappets are adjusted to lie closer to the rotor than the (labyrinth) seal grooves. The tappets are of polythene, and are around twenty in number. The tappets are adjustable from outside the housing, and adjustment may be done with the turbine running.

13 Claims, 4 Drawing Sheets

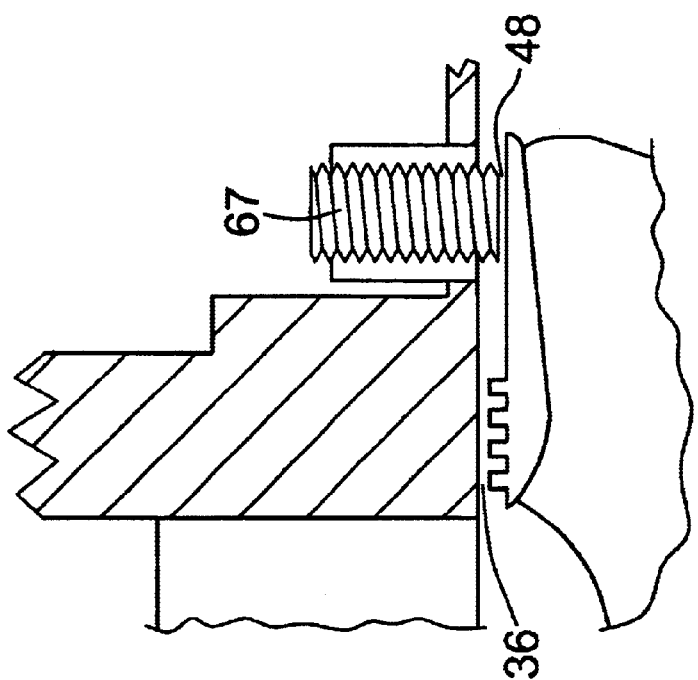
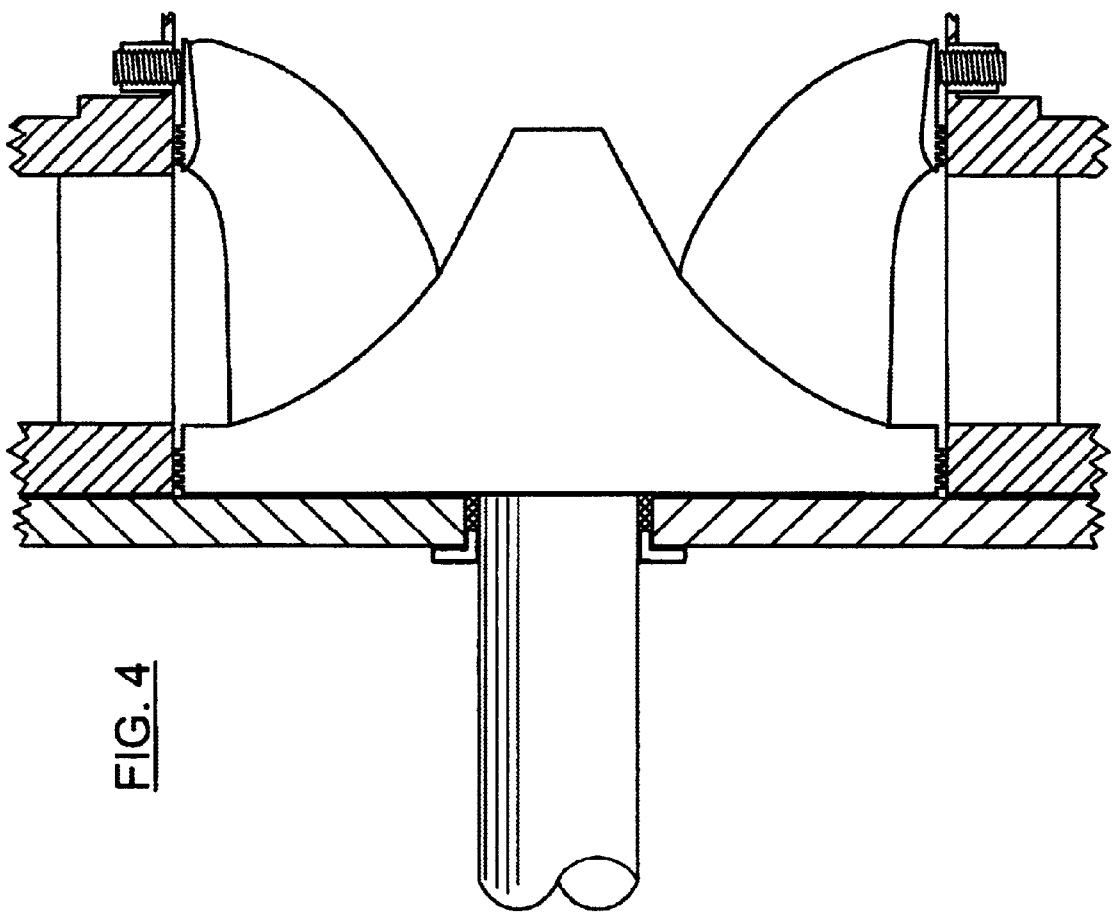

ROTATING SHAFT CONFINEMENT SYSTEM

This invention relates to rotating shafts, of the kind that have a tendency to undergo whip-type vibrations, in service. Such tendencies can occur when, for example, the distance between the shaft bearings is long, and there is a heavy mass on the shaft. In these cases, the critical rotational speed of the shaft, at which the shaft can start to undergo high-amplitude vibratory excursions, is low enough to be within the range of operating speeds.

BACKGROUND TO THE INVENTION

In many rotating-shaft machines, the critical speed of a shaft is far higher than the speeds that can possibly be reached in service, and so no precautions need be taken to protect or contain the shaft against high-amplitude vibrational excursions. But when the shaft is likely to approach its critical speed during service, the designer must consider taking precautions.

These precautions can take the form of a shaft confinement system, by which the shaft is mechanically constrained against moving more than a predetermined transverse or lateral or radial distance. The shaft confinement system might comprise constrainment-rings, for example, or the like, which surround the shaft, and the designer must of course see to it that the rings can cope with the rotating shaft bouncing against, and rubbing against, the constrainment-rings.

The high-amplitude vibratory excursions are measured radially relative to the rotational axis of the shaft. The mode of vibration giving rise to the excursions is often simple bending of the shaft, i.e bending of the shaft between supports defined by the shaft bearings. But in other cases the mode of vibration giving rise to the excursions may be, for example, torsional. The critical speed in question is usually defined by the fundamental frequency of the vibrations, but it may be a harmonic. In many cases, the critical speed is determined by the simple-bending fundamental, but once the shaft starts to bounce against the confinement system, failure may occur due to the resulting high torsional stresses induced in the shaft.

In the case of a Francis turbine, for example, the geometry of the water-duct layout associated with the turbine often means that the shaft, which carries the (heavy) turbine rotor, has to be mounted between bearings which are spaced very far apart. Designers know that the precautions taken, in many Francis turbine installations, against critical-speed vibrations are not enough, and the installation may be troubled by packing-seals blowing out, bearings failing, and by the turbine rotor striking against its casing. Often, the amplitude of the vibrations can be reduced by reducing the power output of the turbine, but of course that is not a satisfactory solution. Often, the speed at which the turbine runs cannot be changed, being set by the electricity generating requirements of the installation.

The need for a shaft confinement system arises when the critical speed of a rotor is low enough to be within the service range of speeds at which the shaft will operate. While this can occur in other kinds of machines, the shaft confinement system of the invention will be described as it relates to a Francis turbine.

In the case of a double-ended Francis turbine, for example, the fundamental vibration of the shaft, in simple bending, might easily have a frequency as low as 10 Hz, whereby the critical speed of the shaft is nominally around 600 rpm. That is well within the range at which it is desired to operate the turbine, so the possibility of vibration problems is very real.

The designer can always protect a shaft from any tendency to whip-type vibrations, by making the critical speed of the shaft far above the operating speed, e.g by adding more bearings, making the shaft thicker, etc. But sometimes, the bearings have to be far apart, and the shaft has to be slender, and the shaft has to carry a heavy weight at the midpoint between the bearings, whereby the critical speed is low enough that the speed at which the shaft is operated is uncomfortably close to the critical speed. The invention is aimed at being useful in those cases. The invention is aimed at limiting the amplitude of whip-type vibrations, and thus at permitting a shaft to rotate at or close to its critical speed.

GENERAL FEATURES OF THE INVENTION

In the context of the invention, it is important to distinguish between the bearings that guide and support the rotating shaft, from the structures that confine the shaft and prevent it from undergoing excessive vibrations. The shaft confinement structure is characterized as a structure that does not support the shaft, and indeed this structure does not even touch the shaft, unless the shaft is undergoing radial excursions. The shaft-bearings, on the other hand, support and guide the shaft at all times, to the extent that it is the bearings that define the axis of rotation of the shaft.

In the invention, the shaft confinement structure includes a series of many tappets, which are pitched around the shaft, or rather, around a rotor component mounted on the shaft. The tappets are mounted in a fixed housing component surrounding the rotor, and protrude inwards, for operative engagement with an outwards-facing surface of the rotor. The tappets are adjustable, and are spaced a small distance away from the outwards-facing surface of the rotor. The tappet-clearance is sufficient that the inevitable (small) run-out of the rotor does not cause the outwards-facing surface of the rotor to touch the tappets, whereby the rotor normally runs clear of the tappets, but the tappet-clearance is small enough that the tappets serve to catch the shaft if the shaft should undergo a radial excursion, before vibrations can build up to a damaging amplitude.

With the invention, the designer need not be so conservative about designing the installation so that the installation is not troubled by approaching or reaching the critical speed. In many cases, the designer can even afford to deliberately include the critical speed within the service range.

The material of the tappet is important. A plastic material is preferred, for its shock-absorptive qualities. Metal is not preferred as a material for the tappets; the shaft will bounce off even a bearing metal, such as bronze, with much of its energy of vibration still present, whereas a plastic tappet tends to absorb and dissipate the energy of the impact. The energy is transformed into heat, of course, but the tappet does not become overheated, in a water turbine, as the water carries away the heat.

The plastic tappets should be dimensioned such that the wear rate of the tappet would be quite high, if just one tappet were to receive the impact of the bouncing rotor. Enough tappets should be provided, around the circumference of the rotor, that the impacts are spread over three or four tappets. In fact, it is preferred that the tappets be dimensioned such that, if one tappet should take the whole impact, that that tappet should wear rapidly; thus, if one tappet should be over-adjusted, it will be the first to touch the rotor, and will quickly wear away, until adjacent tappets start to touch the rotor.

It is preferred, not that the plastic material of the tappet should be springy or resilient, but, as mentioned, that the shaft should bounce back, off the tappet material, with much of its energy dissipated. As a result, the wear rate of a shock-absorptive plastic material, such as polyethylene, as actually measured, can be considerably less, in this mode of use, than the wear rate as measured when using a solid metal material. The rubbing speed of the tappet against the rotor can be very large, e.g. around twenty-five meters/sec, whereby the wear rate of the tappet can be very rapid unless the tappet material has some "give" to it, which limits the impact force.

Also, the material should not be so ductile that the contact-tip of the tappet might tend to mushroom, or to bend over; rather, the effect of the rotor striking the tappet preferably should be for the material of the tappet to simply wear away, by abrasion, without the material distorting in any way. While polyethylene is a satisfactory material, of course, materials other than polyethylene should not be ruled out, in this context.

The size of the contact-tip of the (plastic) tappet is important, since the wear rate of the tappet is affected by the area of the tip. The area of the contact tip should be co-ordinated with the characteristics of the material, to produce a wear rate of the tappet in which one single tappet taking impacts from the rotor on its own is rapidly worn down, but once the rotor strikes three or four tappets, together, the wear rate becomes much smaller.

The tappets should be adjustable as to the clearance between the contact tip and the outwards-facing surface of the rotor. Suitable adjustment mechanisms are described herein.

BRIEF DESCRIPTION OF THE DRAWINGS

By way of further explanation of the invention, exemplary embodiments of the invention will now be described with reference to the accompanying drawings, in which:

FIG. 4 is a cross-section of a single-ended Francis turbine, having a shaft confinement system that embodies the invention;

FIG. 4a is a close-up of a portion of FIG. 4.

DETAILED DESCRIPTION OF THE PREFERRED EMBODIMENTS

The apparatuses shown in the accompanying drawings and described below are examples which embody the invention. It should be noted that the scope of the invention is defined by the accompanying claims, and not necessarily by specific features of exemplary embodiments.

Figure 1:
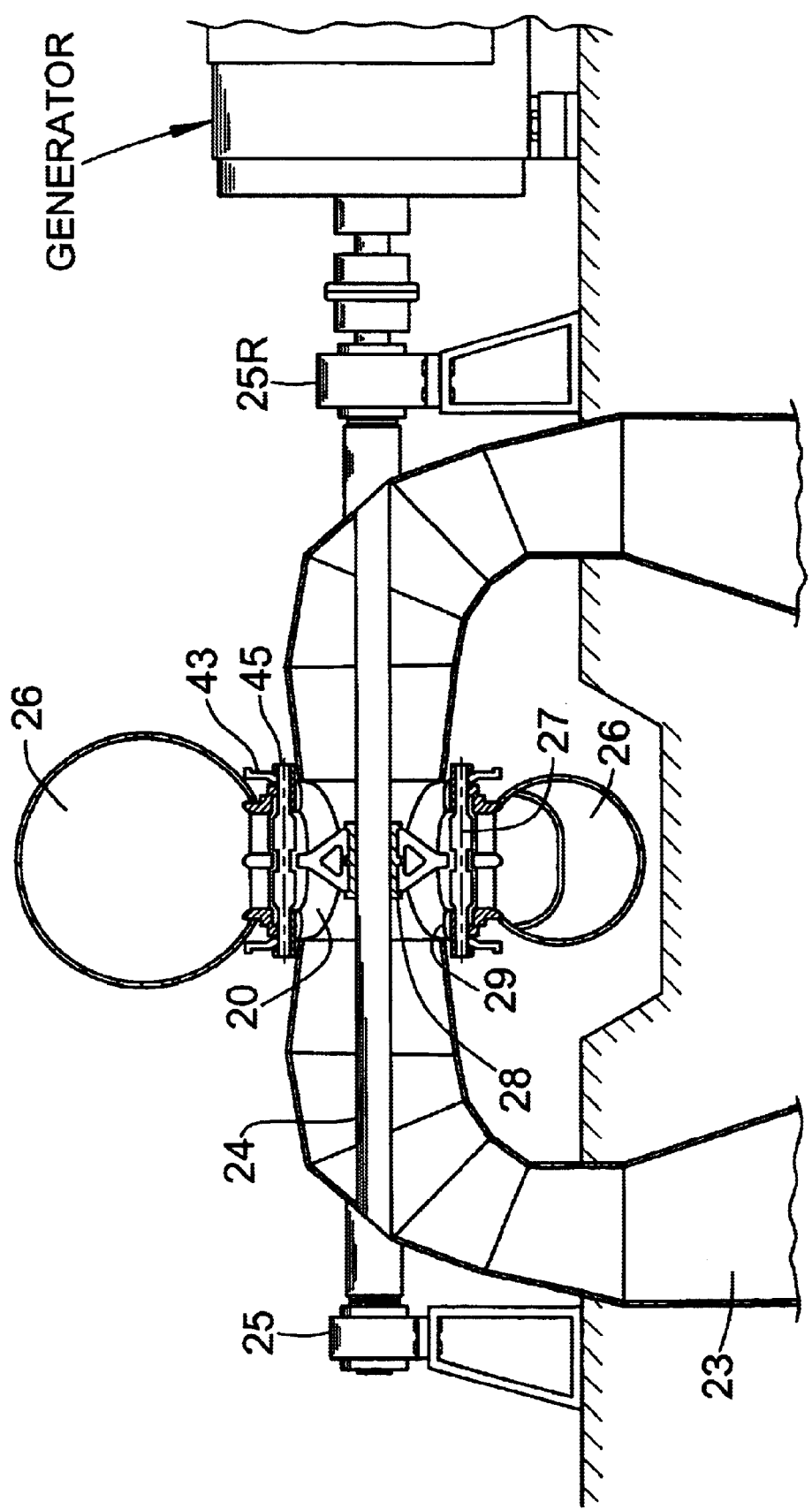
FIG. 1 is cross-sectioned side elevation of a Francis turbine, having a shaft confinement system that embodies the invention (the system is not visible in FIG. 1)

FIG. 1 shows the general layout of a Francis turbine, in which water under pressure is fed into the turbine rotor 20 radially inwards from the scroll-case, and emerges axially from the turbine. As shown, the turbine is double-ended, in that water emerges axially both to the left and to the right.

The designer must see to it that water emerging from the turbine rotor 20 is allowed to pass out of the turbine, and be discharged, with a minimum of resistance or back pressure.

Thus, the discharge ducts 23 should be large, divergent, and have no bends for at least some distance away from the turbine rotor.

These requirements mean that the shaft 24 of a double-ended Francis turbine machine is characteristically long and slender. Typically, in the case of a two MW turbine, for example, the unsupported length (or un-bearinged length) of the shaft 24 between the left and right bearings 25,25R might be four or five meters. The shaft 24 is e.g. fifteen cm diameter. The turbine rotor 20 is typically seventy cm diameter, and represents a heavy mass or weight, carried at the midpoint of the shaft.

The critical speed of such a shaft can be in the region of 600 rpm. That is within the range of speeds over which it is desired to operate the turbine. Thus the rotor shaft is liable to vibrate, during operation, and hence the need for the invention.

Water for driving the turbine enters from the inlet scroll 26, and passes radially inwards through the control-vanes 27. The vanes 27 are pivotable, to control the flow of water into the turbine. There may be twenty or more pivotable control-vanes 27 around the circumference of the rotor.

The rotor 20 is mounted on the shaft 24, at the connection 28, and is solid with the shaft as far as operational function is concerned. The rotor 20 is provided with a left ring 29, having an outwards-facing cylindrical surface 30. The rotor has a corresponding right ring 29R. The rings 29,29R lie radially inside left and right hoops 32,32R, which are components of the fixed stationary housing 34 of the machine in which the control-vanes 27 are mounted for pivoting.

The hoop 32R is machined to provide an inwards-facing cylindrical surface 35, which lies spaced a small radial clearance-distance 36 from the outwards-facing surface 30 of the rotor. The outwards-facing surface 30 of the rotor is provided with grooves 37, which provide labyrinth sealing when the rotor is rotating at speed, whereby water cannot leak around the edges of the rotor, but must pass through the buckets of the turbine rotor. The outwards-facing surface 30 comprises the lands 38 between the grooves 37.

The effectiveness of the labyrinth grooves 37, to prevent leakage, depends on the magnitude of the seal-clearance 36 between the lands 38 between the grooves and the inwards-facing surface 35. If the seal-clearance were too large, the loss of efficiency of the turbine, due to leakage, can be several percent. On the other hand, the seal-clearance should not be allowed to become zero, whereby the lands 38 make touching contact with the surface 35. Any touching can cause wear damage very quickly.

To minimise the chance of the rotor ring touching the stator hoop, the seal-clearance 36 should be large enough to cater for run-out of the rotor. Run-out is measured as the distance a probe in contact with the rotor moves radially in/out as the rotor undergoes a revolution. Preferably, the seal-clearance should also be large enough to cater for any free-play there might be in the shaft bearings, which is also manifested as a radial distance, measurable at the outwards-facing surface 30 of the rotor.

Preferably, the seal-clearance 36 should be set to accommodate the maximum run-out and bearing free-play that might be present, but no more. And of course, the designer should take steps to keep run-out and bearing play to a minimum. The prudent designer would specify a nominal seal-clearance 36 of between ½ and one millimeter (measured on the radius), to cater for these factors.

However, in traditional double-ended Francis turbines, the designer has also had to consider how large to make the seal-clearance 36, to cater for shaft vibrations. The designer has wished to set the seal-clearance so large that the lands 38 still do not touch the surface 35 of the hoop 32, even when the shaft 24 is undergoing vibrations due to operation of the shaft near its critical speed. To accommodate the excursions due to vibration, the designer has had to set the seal-clearance 36 to as much as two or three mm. If less than that, the rotor might bounce against the hoop, and touch the hoop, whereupon wear would very quickly take place at the point of contact. But a seal-clearance as large as t hat will surely lead to considerable leakage inefficiencies.

The present invention provides the tappets 39, the function of which is to contain the shaft and rotor 20 against high-amplitude excursions. Therefore, now, the seal-clearance 36 need only be large enough to cater for run-out and bearing-play; the seal-clearance need not cater for vibratory excursions.

As mentioned, there are some twenty or more pivoting control-vanes 27 disposed around the circumference of the throat 42 through which the water passes just prior to entering the turbine rotor. Typically, in Francis turbines, and as shown in FIG. 1, each control-vane is provided with a lever-arm 43 at the end of the spindle 45 which carries the control-vane 27, linked to the water flow-control system (not shown). (As shown, the left side control-vanes can be pivoted independently of those on the right, whereby one half of the turbine can be throttled off, which can be more efficient than throttling the whole turbine.)

Figure 2:
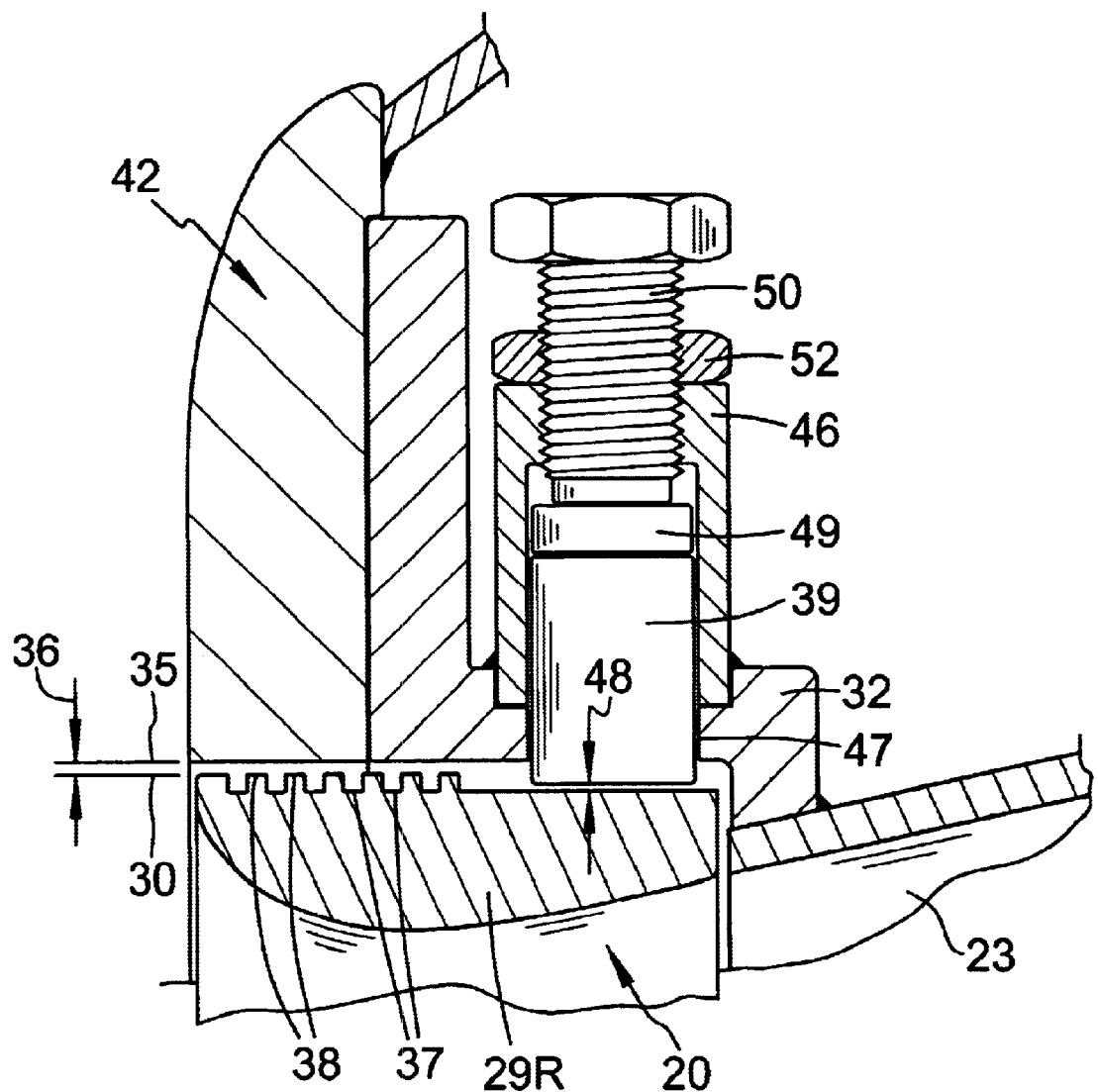
FIG. 2 is a close-up of the shaft confinement system of the Francis turbine of FIG. 1.

The shaft confinement system with which the invention is concerned is provided, in the example shown in FIG. 1 and FIG. 2, in the form of tappets 39, several of the tappets being pitched around the circumference of the hoop 32. The tappets 39 are carried in respective tappet-housings 46. The tappet-housings 46 are individual to the particular tappets, each tappet-housing being fixedly mounted (welded) onto the hoop 32. The tappet-housings 46 are located in the circumferential spaces between the lever-arms 43 attached to the control-vanes 27.

The tappets 39 protrude radially inwards, through respective holes 47 in the inwards-facing surface 35 of the fixed hoop 32, towards the outwards-facing surface 30 of the rotor ring 29.

The seal-clearance 36 between the lands 38 of the labyrinth grooves and the inwards-facing surface 35 of the hoop 32, should be large enough to accommodate the worst (largest) run-out that might be encountered. And the prudent designer will also allow some extra clearance as a safety factor. Each tappet 39 is adjustable relative to its tappet-housing 46. The tappet-clearance 48 should be set to a smaller distance than the seal-clearance 36, to ensure that, if anything touches the rotor, it is the tappet 39, and not the lands 38.

In a particular case, the actual run-out might be quite small, and in that case the tappet-clearance 48 may be set correspondingly small. For example, the seal-clearance 36 might be set to e.g ½ mm, just in case there was some run-out, but the tappet-clearance 48 may be set to say ¼ mm, which is enough to accommodate the actual run-out in the particular case. In any event, the tappet-clearance 48 should be set smaller than the seal-clearance 36, if the tappets 39 are to perform their function of catching and constraining the rotor 20 before the vibratory excursions of the rotor can build up, i.e before the excursions become large enough for the outwards-facing surface of the lands between the seal grooves to make touching contact with the inwards-facing surface of the hoop.

The tappets 39 are radially adjustable. As shown in FIG. 2, the tappet 39 abuts against a washer 49, which is acted upon by an adjusting-screw 50, threaded into the tappet-housing 46. The adjustment setting may be locked by means of a lock-nut 52.

Adjustment of the tappets will usually be carried out with the shaft 24 stationary, i.e. not rotating. In that case, the tappet 39 is screwed inwards, manually, until the tappet just touches the rotor. (This condition can be felt by hand.) Then, the tappet is backed off a suitable distance, to cater for run-out. As mentioned, the designer should see to it that the tappets, when thus backed off, still have a tappet-clearance 48 that is smaller than the seal-clearance 36.

Alternatively, the adjustment of the tappets may be done with the shaft rotating (slowly). Now, the tappet is advanced into contact with the rotor, until the tappet can be felt to be just nudging the rotor, once per revolution. The tappet may be left at that just-touching setting. No backing off is necessary, to cater for run-out of the rotor, since that manner of setting the tappet already caters for whatever run-out might be present, so the designer knows that any further excursion of the rotor beyond that point, if such should occur, must be due to vibratory excursions. Knowing the tappet-clearance will be set in this manner gives the designer a little more leeway in ensuring that the set tappet-clearance 48 will be smaller than the seal-clearance 36.

Figure 3:
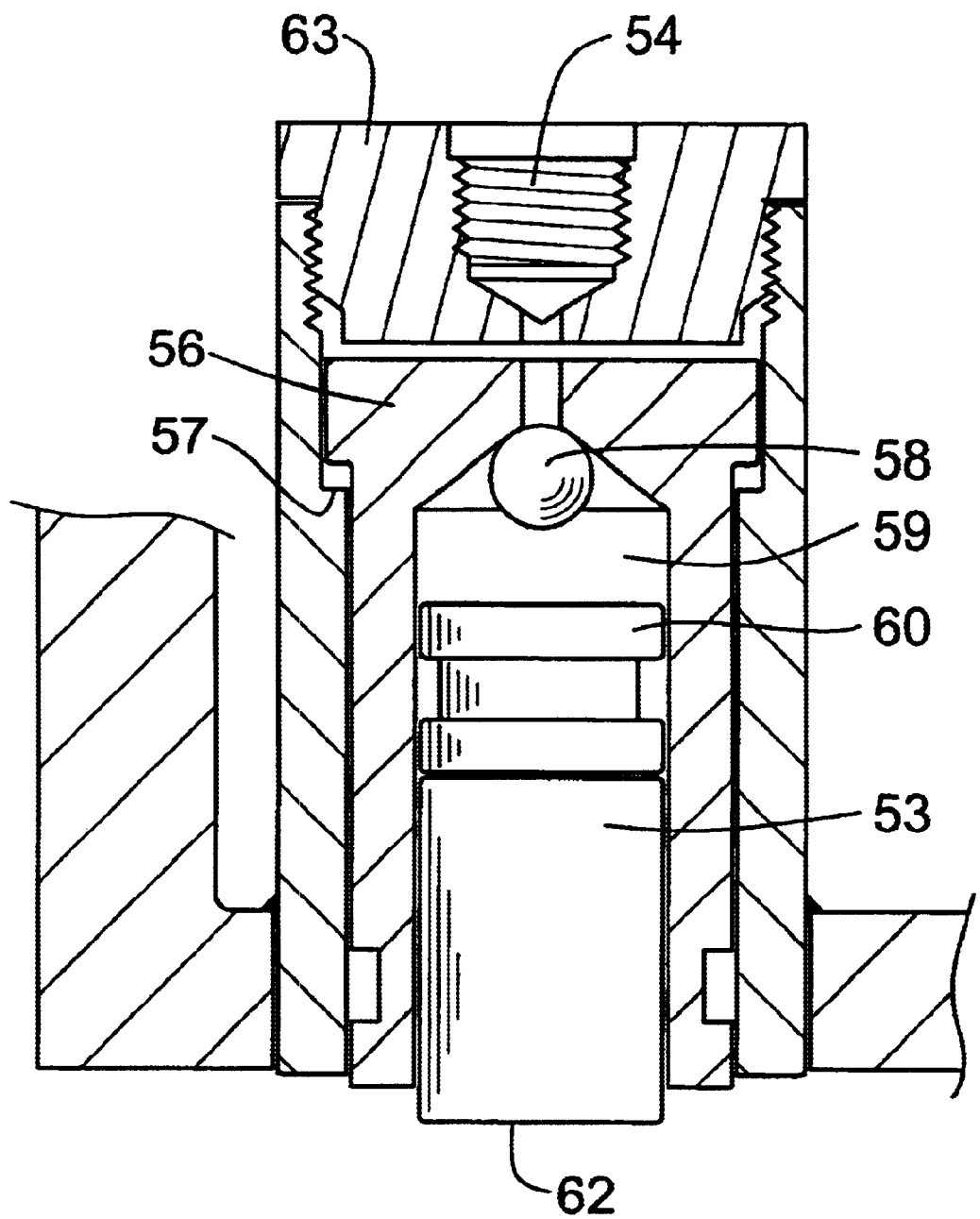
FIG. 3 is a correspondiong close-up of another shaft confinement system that embodies the invention.

Adjusting twenty tappets in this manner (i.e. twenty tappets per ring—forty altogether) can be inconvenient, especially since some of the adjusting-screws 50 do not have complete accessibility. FIG. 3 shows a structure whereby the tappets are advanced simultaneously, each an appropriate distance, upon activation from a central station.

In FIG. 3, the tappet 53 is adjusted hydraulically. A charge of oil or other liquid is introduced at the port 54, which drives the plunger 56 downwards, and into contact with the ledge 57. Injection of more oil opens the check-valve 58, and enters the space 59, which drives the piston 60 and tappet 53 downwards until the contact-tip 62 of the tappet touches the outwards-facing surface 30 of the rotor. Upon the pressure being released, the check-valve 58 closes. Now, the plunger 56 can settle back, until it contacts the plug 63, whereby the contact-tip 62 of the tappet lies the tappet-clearance distance 48 away from the ring. The designer arranges that the slack, or lost motion, of the plunger between the ledge 57 and the plug 63 is enough to cater for run-out, but still is small enough that the outwards-facing surface 30 of the rotor touches the tappets before the lands 38 touch the hoop.

The tappets may be over-adjusted to a small extent, if desired, such that at first after adjustment the rotor will touch against the tappets every rev. However, this constant touching will cause the protruding contact-tips to wear down quite rapidly, whereby, after a short period, the tappets settle to a condition in which they just barely brush against the rotor, each revolution. If possible, the shaft should be kept turning at a speed well below the critical speed during this running-in period, although the period might then be quite long. Then, when the speed is later increased, and the possibility of vibratory excursions starts to arise, the tappets are ideally placed to catch the excursions before they can build up amplitude.

The tappets will need to be re-adjusted after a period of service. But this period may be expected to be several months, even if the turbine is running close to its critical speed, because the tappets keep vibratory excursions contained, to a very small amplitude.

As the tappets do become worn, vibrations might become more perceptible, signalling the need for adjustment. If the tappets become too worn, whereby the tappet-clearance 48 now is no less than the seal-clearance 36, vibrations might lead to the labyrinth lands touching the hoop, which of course should be avoided. As mentioned, the designer might take advantage of the presence of the tappets to reduce the seal-clearance, but this does require some attention to be paid to keeping the tappets in adjustment.

It is important that there be several tappets. It might be contemplated that if just three or four tappets were provided, in total, they would suffice to catch the shaft, and contain it against excursions. However, that is not preferred. If a bouncing rotor were to strike against just one single tappet, and then rebound against another single tappet, the contact force, and the wear rate, at each point would be high. But when many tappets are present, the tappets that happen to protrude a little more than the others will be subjected to increased wear, until, soon, all the tappets would have similar clearances. After that, should the shaft approach the critical speed, as soon as vibrations commence, the shaft is contained and constrained, and simply cannot move in any radial direction without coming into contact with several tappets, which, together, can provide a solid restraint, which is very effective to prevent bouncing of the shaft.

It is preferred in the invention that the tappet be of such nature that the tappet wears rapidly if the shaft bounces against just one single tappet. Indeed, the fact that if just one tappet protrudes it is quickly worn down, is the reason why independent adjustment of the tappets can be acceptable. Manual adjustment of twenty tappets, separately, is bound to lead to some tappets protruding more than others, but that is acceptable because the protruding ones are quickly worn down. The designer should arrange the tappets such that, only when the rotor contacts three or four tappets, does the wear rate slow down to negligible values. Thus, following a period of bedding-in after an adjustment, if the rotor starts to bounce, each time it bounces against the tappets it strikes three or four tappets.

The tappets should be sufficiently long that they can be adjusted several times. Each tappet should have a minimum of about two cm adjustment-length.

The area of the contact-tip of the tappet is important. In a particular case, the hoop 32 was seventy cm diameter, and there were twenty-two tappets, and each (polyethylene) tappet had an area of about 4½ sq cm. As far as expressing a limitation is concerned, the number of tappets preferably should exceed fifteen, and each tappet preferably should have a contact-tip area of between two sq cm and six sq cm. If the diameter of the hoop should be substantially different from seventy cm, the number of tappets should be changed pro-rata, but the contact-tip areas preferably should remain at two to six sq cm.

If the contact-tip area were larger, an over-protruding tappet would not be worn down; if smaller, even a bank of tappets might be worn down too quickly.

The tappets are not only adjustable from outside the hoop, but are replaceable from outside the hoop. Thus, the turbine machine does not have to be dismantled when changing the plastic tappets, once the machine has had the tappets shaft-containment system installed. The tappets could even be replaced while the turbine is running—although some water would be lost out of the holes 47—but this could be done if the turbine has to be kept running.

The tappets can not only be adjusted when the shaft is stationary, but easily be adjusted while the turbine is running. That is advantageous because the dynamic position of the shaft might be different from its static position. (The equilibrium position of the shaft when sagging under its won weight might be different from the equilibrium position of the shaft when acted upon by the dynamic reactions to the forces of the water passing through the turbine rotor. The engineer should therefore set the shaft to rotate at a slow speed, but with water passing through, and should then adjust the tappets. The machine may be left in this state to allow the tappets to become bedded-in. Then, when the rotor is run up to its service speed, the tappets will be nearer to the ideal settings than if the adjustment had been done while stationary.

When the adjustment is being done manually, each tappet is advanced until it just touches the rotor, and is then backed off a suitable distance (say ¼ mm). The adjustment could be done fully automatically, but then the designer must take care the adjustment sensor does not sense run-out as a need for adjustment, which may be over-elaborate. Preferably, the adjustment should be done either manually individually, or the adjusters should be linked together so that all can be set from a central station, as in FIG. 3. With twenty or more tappets around a circumference, they might not all be well accessible for adjustment; plus, the large number gives opportunity for one or more tappets to be mal-adjusted.

The tappets should be solidly abutted within the tappet-housings. There should be no spring, or other resilience, in the abutment. Resilience would mean that the energy of the impacting rotor would be returned to the rotor. What is needed is for "give" (as occurs inherently with a tappet made of polyethylene) rather than springiness, the difference being the extent to which impact energy is returned to the rotor. The tappet should be "dead" in its response to an impact from the rotor.

The tappet adjuster must be capable of being set to the correct clearance, and must be capable of being locked in that setting. The manner of locking must be secure enough to hold the adjustment setting even though the machine may be vibrating. The screw-thread system as described meets those requirements, as does the hydraulic adjustment system.

The shaft confinement system, as described, may be included on other shafts and rotors that are liable to vibrations, besides double-ended Francis turbines. FIGS. 4 and 4a show an example in which a heavy rotor is mounted on a shaft which overhangs its bearings. Here, the tappets are provided in the form of posts 67 of polyethylene. The posts are screw-threaded into metal holders welded into the hoop 68. As described above, the tappet-clearance 48 is adjusted and set smaller than the seal-clearance 36.

What is claimed is:

1. Apparatus for limiting the amplitude of transverse vibratory excursions of a rotating shaft, wherein:

the apparatus has a shaft, supported between bearings, which define the axis of rotation of the shaft;

the shaft has an un-bearinged-portion thereof, which is remote from and unsupported by the bearings, and carries a rotor thereon, which is liable to undergo vibrations of a substantial radial amplitude when the shaft is rotating;

the apparatus includes an amplitude-limiting structure;

the amplitude-limiting structure includes adjustable tappets, disposed around the rotor, which are set in, and are adjustable relative to, a fixed housing;

the tappets are set to be clear of the rotor when the shaft is rotating slowly, but to be impacted by the rotor if the vibrations exceed a predetermined radial amplitude;

the material of the tappets is such that the tappets absorb the impact of the rotor impacting the tappets, whereby much of the energy of the impact is dissipated.

2. Apparatus for limiting the amplitude of transverse vibratory excursions of a rotating shaft, wherein:
- the shaft is mounted in journal bearings, being a left bearing and a right bearing;
- the left bearing includes a left bearing-shaft-portion and a left bearing-housing;
- the right bearing includes a right bearing-shaft-portion and a right bearing-housing;
- the bearing-shaft-portions are components of the shaft, and the bearing-housings are components of a fixed housing of the apparatus;
- the bearings define an axis of rotation of the shaft;
- the bearings are so structured as to constrain the bearing-shaft-portions against radial movement, relative to the respective bearing-housings;
- the remainder of the shaft, other than the left and right bearing-shaft-portions, is termed the un-bearinged-portion of the shaft;
- the structure of the apparatus is such that the left and right bearing-housings constrain the left and right bearing-shaft-portions respectively of the shaft against transverse vibratory excursions, but the left and right bearing-housings do not constrain the un-bearinged-portion of the shaft against radial excursions;
- the shaft includes a rotor, which is mechanically solid with the shaft;
- the rotor lies in the un-bearinged-portion of the shaft, being axially spaced, on the shaft, away from the left and right bearings;
- the rotor has a ring, with an outwards-facing surface, which is concentric with the shaft axis;
- the outwards-facing surface of the ring is circumferentially continuous;
- the apparatus includes several excursion-limiting tappets;
- the tappets are pitched around the ring, and are carried in respective tappet-housings, which are mounted to a hoop of a fixed housing;
- the tappets have respective contact-tips;
- the structure of the apparatus is such that the contact-tips are positioned radially outside, and clear of, the outwards-facing surface of the ring, by respective tappet-clearance distances;
- the tappets are provided with respective operable tappet-adjusters, and respective operable adjustment-locks;
- in respect of each one of the tappets:
  - its respective tappet-adjuster is effective, when operated, to move the tappet radially towards and away from the outwards-facing surface of the ring, and thereby to reduce and increase its tappet-clearance, being the distance between its contact-tip and the outwards-facing surface of the ring;
  - its adjustment-lock is effective, when operated, to lock the tappet at the adjusted position relative to its tappet-housing, and thereby at its adjusted tappet-clearance;
  - the tappet lies in a condition of adjustment in which, when the shaft is turning slowly about the axis defined by the left and right bearings, its tappet-clearance is large enough that the tappet is substantially clear of the outwards-facing surface of the ring;
  - its tappet-clearance is small enough that, when the shaft undergoes a radial vibratory excursion, the outwards-facing surface of the ring impacts against the tappet at an amplitude-A of the excursion, being an amplitude that is small enough to be non-damaging to the shaft, bearings, ring, tappets, and fixed housing;
  - the structure of the tappet is such as to physically and mechanically restrain the outwards-facing surface of the ring, and thereby the shaft, against an increase in amplitude of such excursions beyond amplitude-A.

3. Apparatus of claim 2, wherein the area of the contact tip of the tappet is between two sq cm and six sq cm.

4. Apparatus of claim 3, wherein no portion of the fixed housing is closer to the rotor than the contact-tips of the tappets.

5. Apparatus of claim 2, wherein:
- the outwards-facing surface of the ring is cylindrical, and is of diameter D cm;
- the number of tappets is N, where N exceeds 15*D/70.

6. Apparatus of claim 2, wherein the material of the tappets is plastic.

7. Apparatus of claim 6, wherein the material of the tappets is polyethylene.

8. Apparatus of claim 2, wherein the said shaft and rotor comprise the shaft and turbine runner of a Francis turbine.

9. Apparatus of claim 2, wherein each tappet is adjustable independently of the other tappets.

10. Apparatus of claim 2, wherein the tappets are adjustable simultaneously, upon activation of a central adjustment station.

11. Apparatus of claim 2, wherein there is substantially no spring or resilience in the mounting of the tappets within their tappet-housings.

12. Apparatus of claim 2, wherein the rubbing speed of the outwards-facing surface of the ring of the rotor, relative to the contact-tip of the tappet, during normal operation of the shaft and rotor, is twenty meters/sec or more.

13. Apparatus of claim 2, wherein:
- the area of the contact tip of the tappet is between two sq cm and six sq cm;
- no portion of the fixed housing is closer to the rotor than the contact-tips of the tappets;
- the outwards-facing surface of the ring is cylindrical, and is of diameter D cm, and the number of tappets is N, where N exceeds 15*D/70;
- the material of the tappets is polyethylene;
- the said shaft and rotor comprise the shaft and turbine runner of a Francis turbine;
- each tappet is adjustable independently of the other tappets;
- there is substantially no spring or resilience in the mounting of the tappets within their tappet-housings;
- the rubbing speed of the outwards-facing surface of the ring of the rotor, relative to the contact-tip of the tappet, during normal operation of the shaft and rotor, is twenty meters/sec or more.

* * * * *